(12) United States Patent
Sun et al.

(10) Patent No.: US 7,724,414 B2
(45) Date of Patent: May 25, 2010

(54) SPATIAL LIGHT MODULATOR

(75) Inventors: Ching-Cherng Sun, Hsinchu (TW); Yeh-Wei Yu, Hsinchu (TW); Shu-Ching Hsieh, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 12/172,418

(22) Filed: Jul. 14, 2008

(65) Prior Publication Data
US 2009/0303560 A1 Dec. 10, 2009

(30) Foreign Application Priority Data
Jun. 6, 2008 (TW) .............................. 97121204 A

(51) Int. Cl.
*G02F 1/01* (2006.01)
(52) U.S. Cl. ........................ 359/238; 359/240; 359/279; 359/11; 359/30

(58) Field of Classification Search .................. 359/238
See application file for complete search history.

(56) References Cited
U.S. PATENT DOCUMENTS

| | | | |
|---|---|---|---|
| 4,082,415 A * | 4/1978 | Brooks et al. .................. 359/20 |
| 6,842,285 B2 * | 1/2005 | Gluckstad .................... 359/559 |
| 7,362,482 B2 * | 4/2008 | Kihara ........................ 359/11 |
| 2004/0085662 A1 * | 5/2004 | Mimori et al. .............. 359/883 |
| 2006/0086794 A1 * | 4/2006 | Knowles et al. ............. 235/454 |

* cited by examiner

*Primary Examiner*—Jessica T Stultz
(74) *Attorney, Agent, or Firm*—Muncy, Geissler, Olds & Lowe, PLLC

(57) ABSTRACT

A spatial light modulator applied to the collinear volume holographic storage system uses a hollow phase modulator to modulate the surrounding portion of an incident light to be a reference light, and the center portion of the incident light is modulated by an amplitude modulator to be a signal light. Thus, the spatial light modulator can enhance the convergence of the point spread function of the system.

13 Claims, 7 Drawing Sheets

SPATIAL LIGHT MODULATOR

BACKGROUND OF THE INVENTION

1. Field of the Invention

This invention relates to a spatial light modulator applied to a collinear volume holographic storage system, and, especially, to a spatial light modulator that can enhance the convergence of the point spread function of this system.

2. Description of the Prior Art

The collinear holographic storage system is the main development in these years, since the collinear holographic technique has the features of high stability, high reliability and high miniaturability.

In the writing process, the collinear holographic storage system uses a spatial light modulator to generate a signal light and a reference light as a laser light passes the spatial light modulator. After the signal light and the reference light pass a phase modulating mask, the interference will be focused by a lens and recorded homogeneously on a recording medium. In the reading process, the laser light is modulated to a reference light and irradiates on the recording medium to restore the signal via the recorded interference. Finally, the restored light irradiates on a photo-detector and can be read.

FIG. 1a is employed to illustrate the light path of the system in the writing process. The spatial light modulator 200 modulates the incident light 100 to a signal light 110 and a reference light 120, and a lens 300 focus the interference of the signal light 110 and the reference light 120 on a recording medium 400 to be recorded.

FIG. 1b is employed to illustrate the light path of the system in the reading process. The spatial light modulator 200 modulates the incident light 100 to a reference light 120 only, and, after the reference light 120 passes the lens 300, the reference light 120 irradiates on the recording medium 400 to restore the signal light 110 and the reference light 120 via the recorded interference. The restored interference is focused on and irradiates on a photo-detector 600 and can be read.

The structure of a reflective holographic storage system is different from the transmissive system, abovementioned system, but in the similar theory. The rear face of the recording medium 400 is coated with a reflective material 410, and a splitter 700 is set in the light path. In the writing process, the signal light 110 and the reference light 120 pass the splitter 700 and lens 300 to irradiate on the recording medium 400. In the reading process, the reference light 120 is reflected by the reflective material 410 after passing the splitter 700 and lens 300 to restore the interference. The restored interference passes the splitter 700 and will be reflected to a photo-detector 600 for reading. The light paths in the writing process and reading process are shown in FIG. 2a and FIG. 2b.

The above mentioned spatial light modulator has a disadvantage of poor convergence of the point spread function.

SUMMARY OF THE INVENTION

It is an object to provide a spatial light modulator for improving the convergence of the point spread function. The mean is to set a phase modulator surrounding an amplitude modulator.

In the writing process, the spatial light modulator modulates the surrounding portion of the incident light to a reference light and the center portion to a signal light. In reading, the center part of the spatial light modulator is blocked for avoiding generating the signal light, and the reference light will irradiate on the recording medium to restore the recorded interference.

DESCRIPTION OF THE PREFERRED EMBODIMENT

Spatial light modulator includes a amplitude modulator and a phase modulator with a hollow, and the amplitude modulator and the phase modulator can be arranged in compact or in separation. The surrounding portion of an incident light is modulated into a reference light by the phase modulator and the center portion to a signal light by the amplitude modulator. The interference of the reference light and the signal light will be recorded on a recording medium after passing a phase modulating mask. Accompanying with FIG. 3a and FIG. 3b, the description of the light paths of the transmissive holographic storage system is following.

Figure 1A:
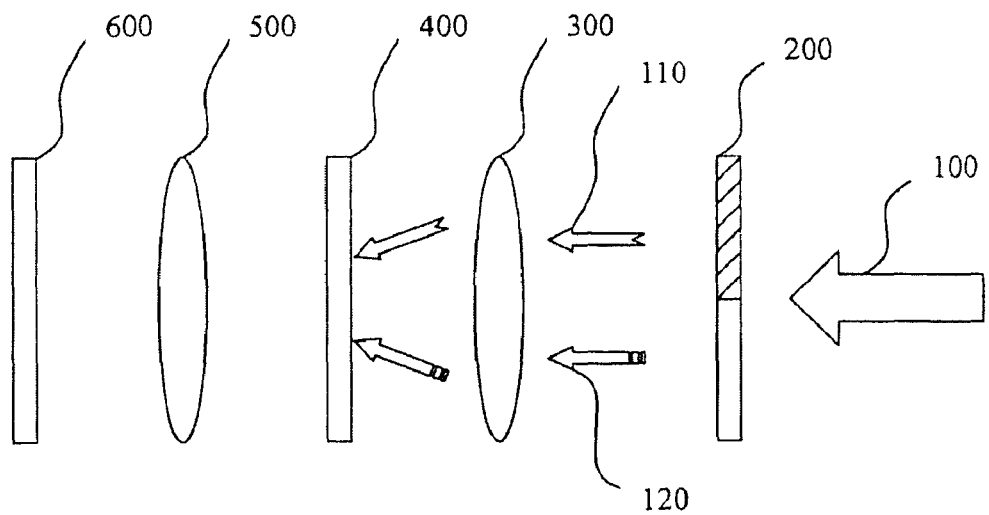
FIG. 1a and FIG. 1b show the light paths of a transmissive holographic storage system of a prior art in the writing and reading process, respectively.
Figure 1B:
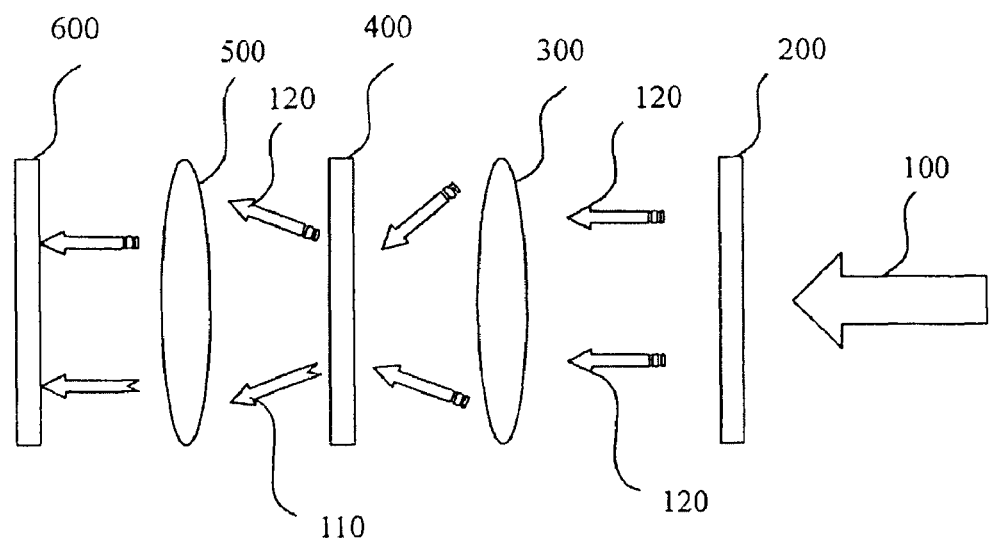
Figure 2A:
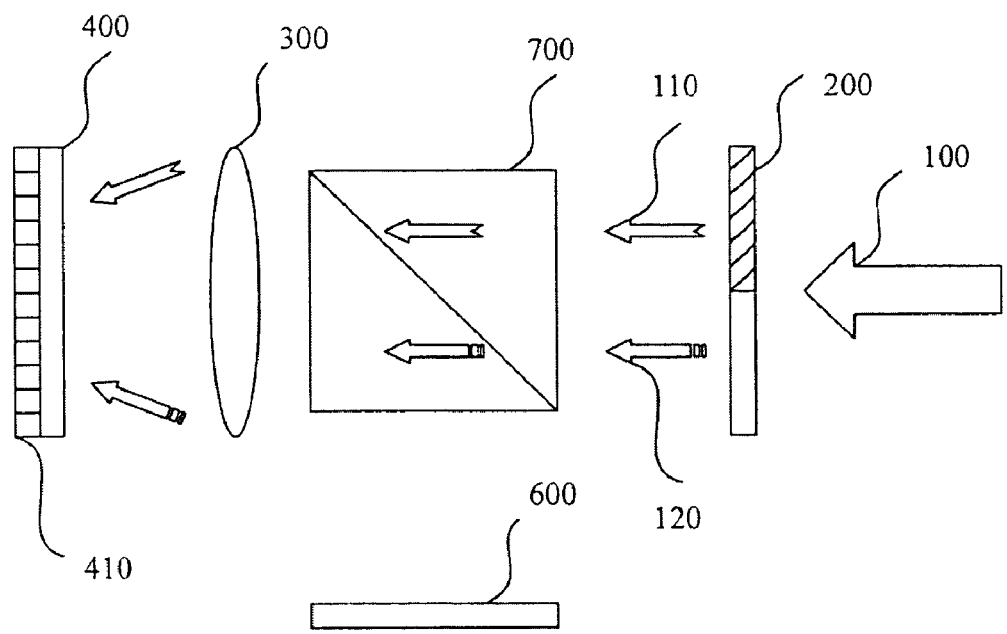
FIG. 2a and FIG. 2b show the light paths of a reflective holographic storage system of a prior art in the writing and reading process, respectively.
Figure 2B:
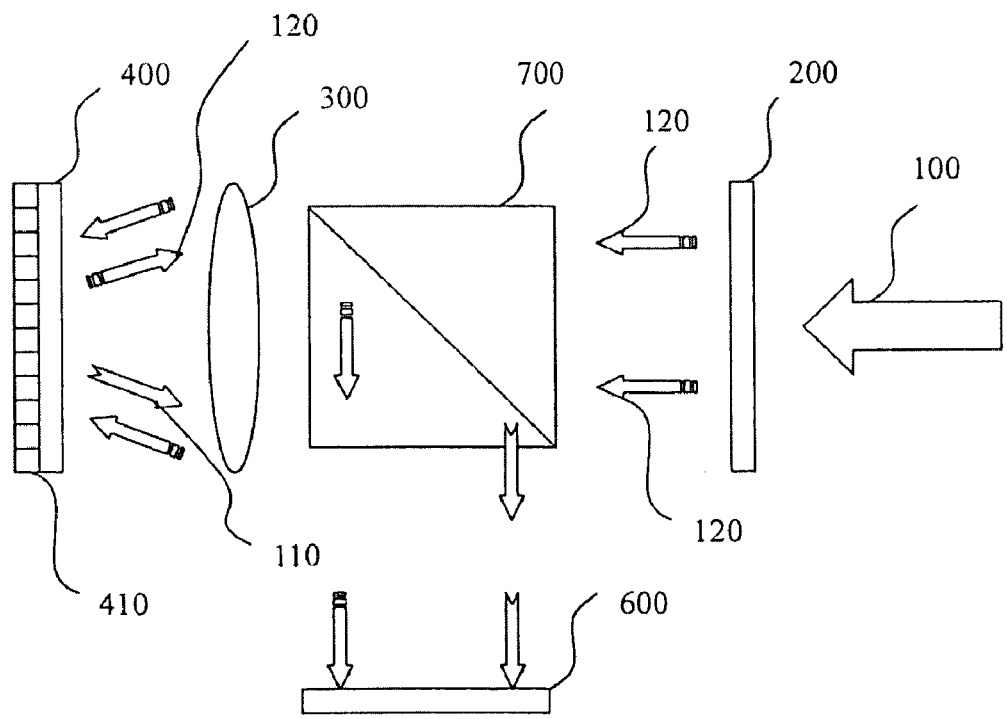
Figure 3A:
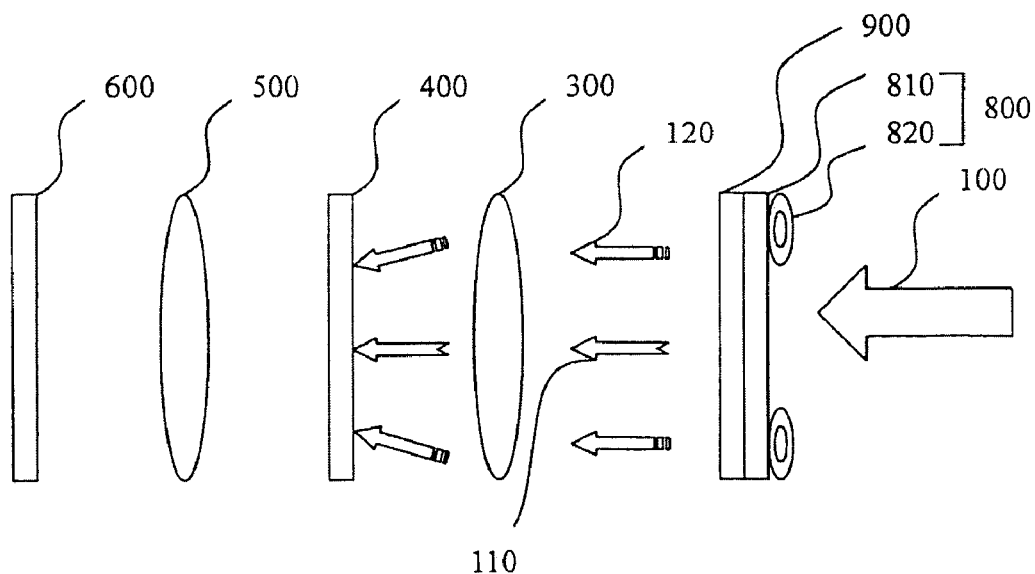
FIG. 3a and FIG. 3b show the light paths of a transmissive holographic storage system employing a spatial light modulator according to an embodiment of this invention in the writing and reading process, respectively.

In the writing process, as FIG. 3a, a hollow phase modulator 820 is adhered to a amplitude modulator 810 to form a spatial light modulator 800, and a phase modulating mask 900 is adhered to the spatial light modulator 800. The incident light 100 passes the spatial light modulator 800 and the phase modulating mask 900 to form a reference light 120 on the surrounding part of the spatial light modulator 800 and to form a signal light 110 in the center part. The interference of the reference light 120 and the signal light 110 is recorded on a recording medium 400 after passing a lens 300.

Figure 3B:
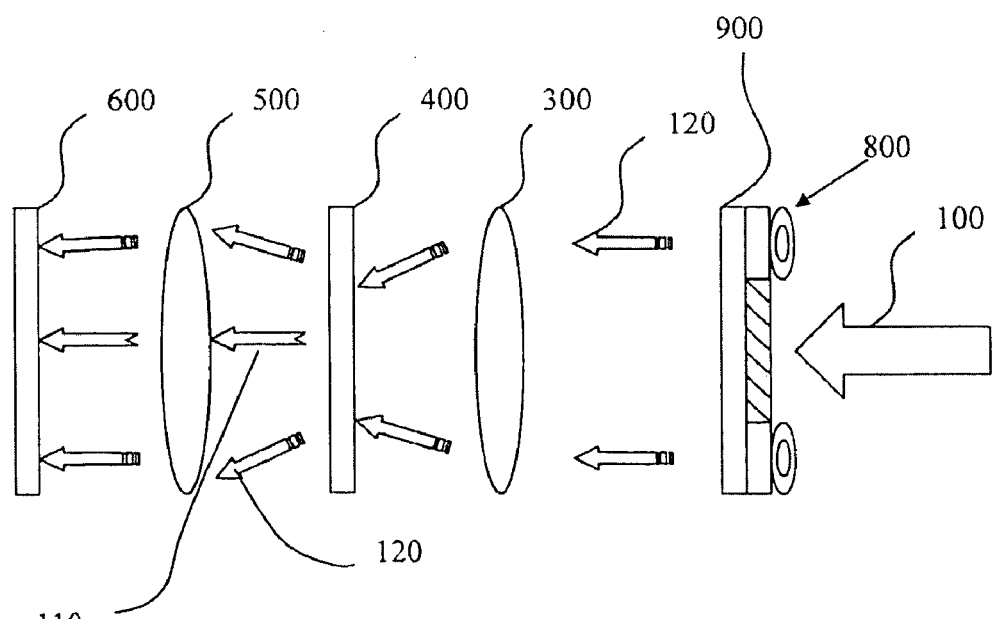

In the reading process, as FIG. 3b, the center part of the spatial light modulator 800 is covered. The incident light 100 can not pass the center part of the spatial light modulator 800, and the surrounding portion of the incident light 100 is modulated to a reference light 120 after passing the spatial light modulator 800 and the phase modulating mask 900. The reference light 120 irradiates on the recording medium 400 after the reference light 120 passes the lens 300 to restore the signal light 110, and the restored signal light 110 will pass a second lens 500 to be detected by a photo-detector 600.

Reflective holographic storage system works in a similar way to the transmissive holographic storage system so the detailed description is omitted here except for the difference. The difference between these two systems is that the former has a reflective material coated on the rear face of the recording medium, a splitter is set in the light path and the second lens (the second lens 500 in previous embodiment) can be omitted. The splitter will guide the restored interference light to the photo-detector.

The phase modulator and the amplitude modulator of the spatial light modulator can be set in compact or in separation, and even more, the phase modulator and the amplitude modulator can be set in interlace between the other optical components of the system. The preferred embodiments are showing in FIG. 4a-FIG. 4h.

Figure 4A:
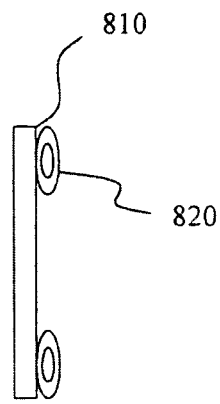
FIG. 4a-4g show spatial light modulators according to the preferred embodiments of this invention.
Figure 4B:
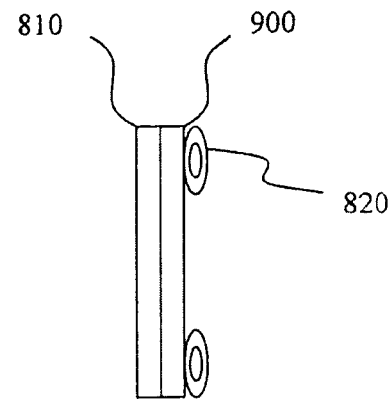

FIG. 4a shows an embodiment, where the phase modulator 820 is adhered to a amplitude modulator 810. FIG. 4b shows another embodiment, where the phase modulator 810 and the amplitude modulator 810 clip the phase modulating mask 900.

Figure 4C:
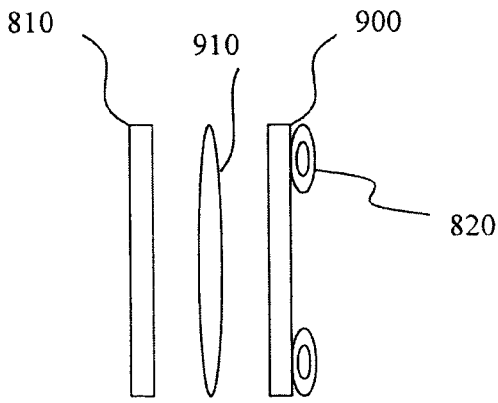
Figure 4D:
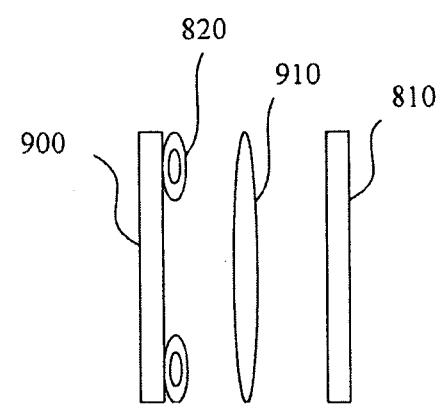

For the embodiments of FIG. 4c and FIG. 4d, the phase modulator 820 is adhered to the phase modulating mask 900 and separated from the amplitude modulator 810, and a lens 910 is placed in between them. No specific order is required for these optical components.

Figure 4E:
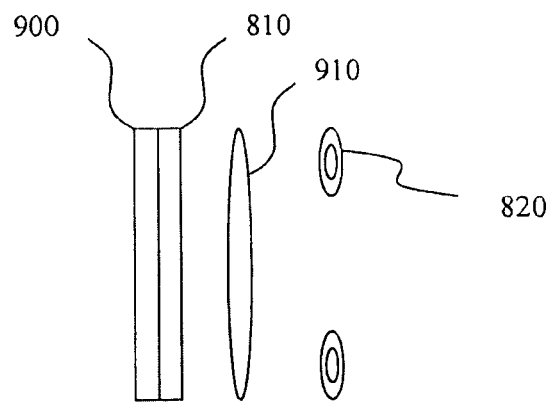

For the embodiment of FIG. 4e, the amplitude modulator 810 is adhered to the phase modulating mask and separated from the phase modulator 820, and a lens 910 is placed in between them. No specific order is required for these optical components.

Figure 4F:
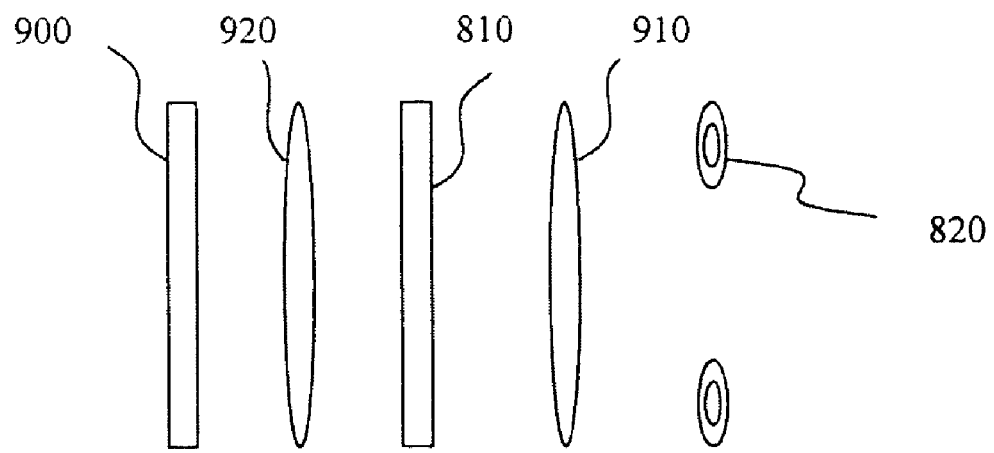
Figure 4G:
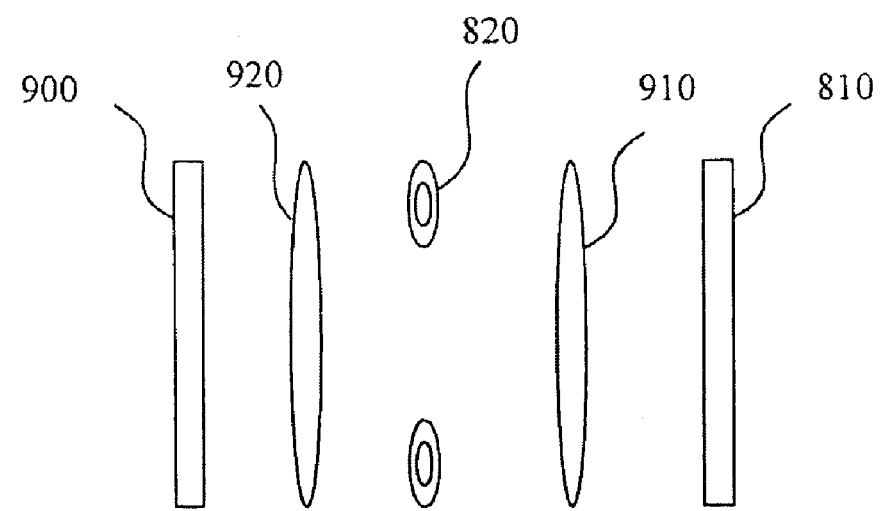

For the embodiments of FIG. 4f and FIG. 4g, the phase modulator 820, the amplitude modulator 810 and the phase modulating mask 900 are separated from each other totally. Lenses 910, 920 are placed between two components thereof. No specific order is required for these components.

The phase modulators 802 in abovementioned embodiments can be made from a lens with a hollow. The FIG. 5a-FIG. 5k are the preferred embodiments of the phase modulator according to this invention.

Figure 5A:
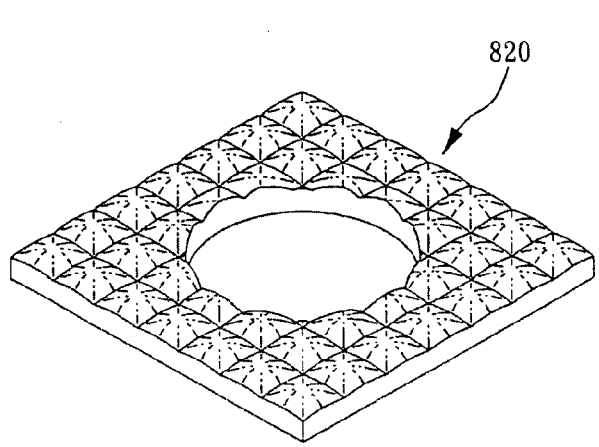
FIG. 5a-5k show phase modulators according to the preferred embodiments of this invention.
Figure 5B:
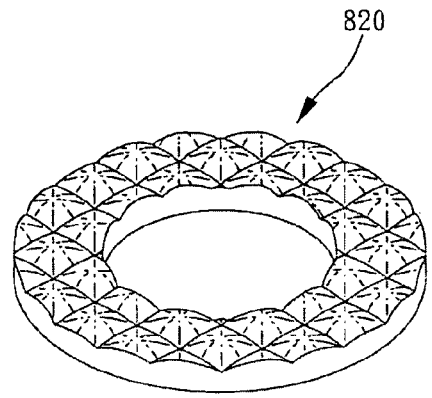
Figure 5C:
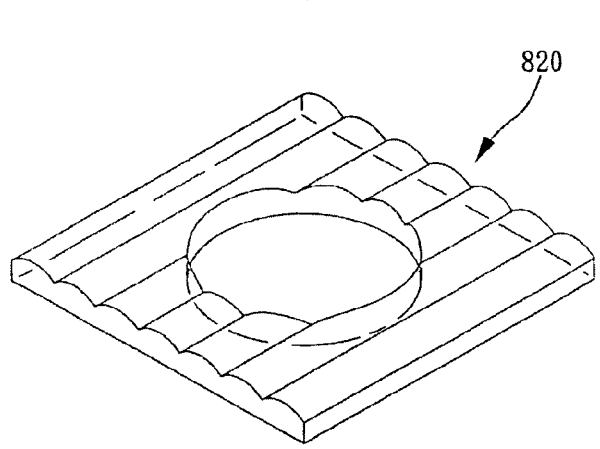
Figure 5D:
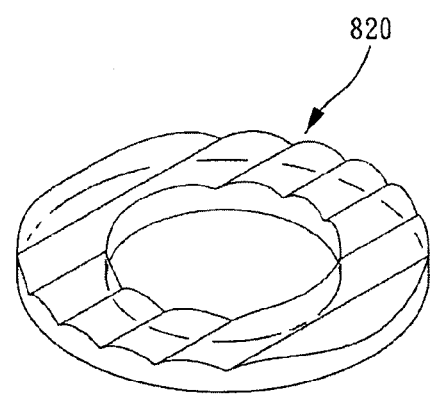
Figure 5E:
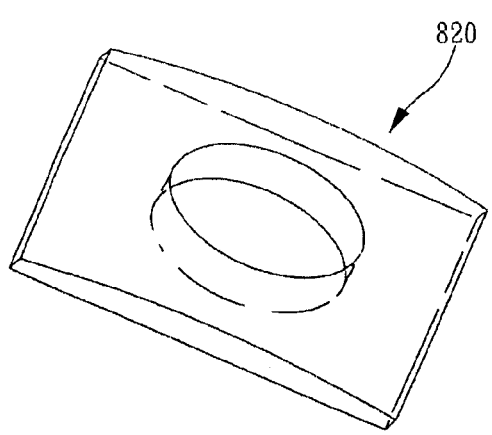
Figure 5F:
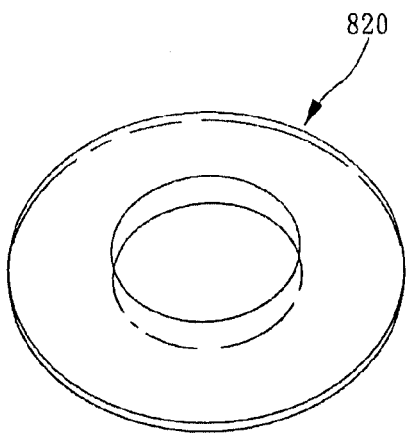
Figure 5G:
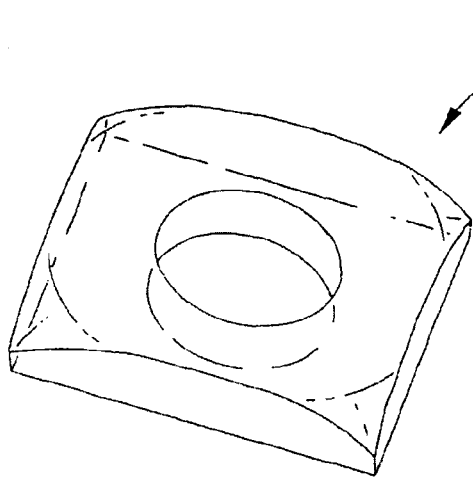
Figure 5H:
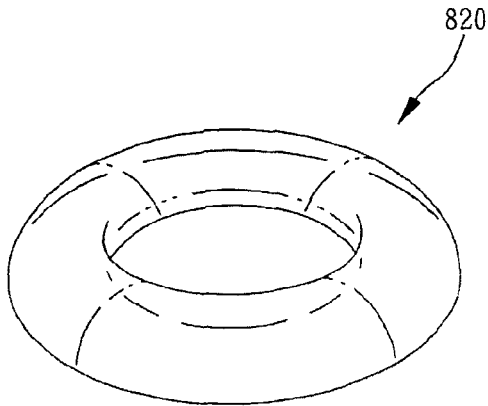
Figure 5I:
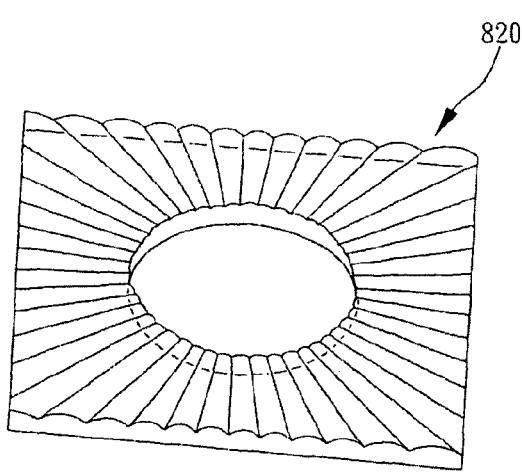
Figure 5J:
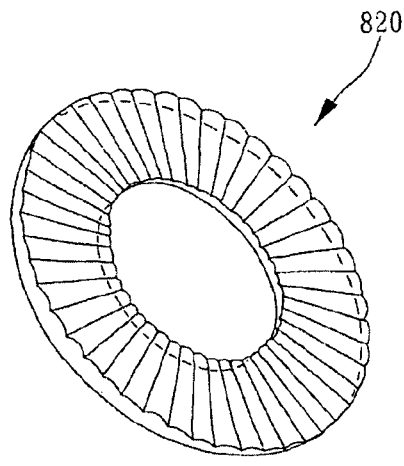
Figure 5K:
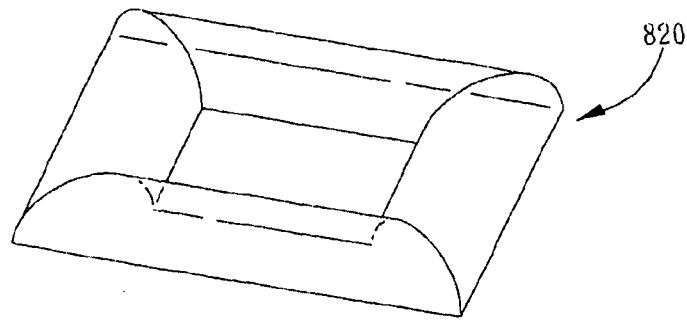

FIG. 5a and FIG. 5b are a recto-ring-like and a circle-ring-like array of spherical lens with a hollow, respectively. FIG. 5c and FIG. 5d are a recto-ring-like and a circle-ring-like array of pillar lens with a hollow, respectively. FIG. 5e and FIG. 5f are recto-ring-like and circle-ring-like lenses with a hollow, respectively. FIG. 5g and FIG. 5h are recto-ring and circle-ring lenses with a hollow, respectively. FIG. 5i and FIG. 5j are recto-ring-like and circle-ring-like loop array of coned lenses with a hollow, respectively. FIG. 5k is recto array of pillar lenses with a hollow.

Although this invention has been explained in relation to its preferred embodiment, it is to be understood that modifications and variation can be made without departing the spirit and scope of the invention as claimed.

What is claimed is:

1. A spatial light modulator, applied to a collinear volume holographic storage system, comprising an amplitude modulator and a phase modulator with a hollow, wherein said phase modulator is set corresponding to said amplitude modulator, and said phase modulator modulates a surrounding portion of an incident light to a reference light and said amplitude modulator modulates the center portion of said incident light to a signal light, and a selective blocking member upstream of said amplitude modulator and said phase modulator, wherein said selective blocking member is configured to block the center portion of the incident light from passing said amplitude modulator and said phase modulator but not the surrounding portion of the incident light in a read configuration, and not to block the center portion of said amplitude modulator and said phase modulator in a write configuration.

2. A spatial light modulator according to claim 1, wherein said phase modulator is a recto-ring-like or a circle-ring-like array of spherical lenses with a hollow.

3. A spatial light modulator according to claim 1, wherein said phase modulator is, a recto-ring-like or a circle-ring-like array of pillar lenses with a hollow.

4. A spatial light modulator according to claim 1, wherein said phase modulator is a recto-ring-like or circle-ring-like lens with a hollow.

5. A spatial light modulator according to claim 1, wherein said phase modulator is a recto-ring-like or circle-ring-like loop array of coned lenses with a hollow.

6. A spatial light modulator according to claim 1, wherein said phase modulator is a recto array of pillar lenses with a hollow.

7. A spatial light modulator according to claim 1, wherein said phase modulator, with a hollow, is adhered to said amplitude modulator.

8. A spatial light modulator according to claim 1, wherein said phase modulator, with a hollow, and said amplitude modulator are adhered to both sides of a phase modulating mask.

9. A spatial light modulator according to claim 1, wherein said phase modulator, with a hollow, is adhered to a phase modulating mask and separated from said amplitude modulator with a space, and a lens is placed in said space.

10. A spatial light modulator according to claim 1, wherein said amplitude modulator is adhered to a phase modulating mask and separated from said phase modulator, with a hollow, with a space, and a lens is placed in said space.

11. A spatial light modulator according to claim 1, wherein said amplitude modulator, said phase modulator, with a hollow, and a phase modulating mask are separated from each other with a space and a lens is set in each space of two components thereof.

12. The spatial light modulator according to claim 1, further comprising:
    a first lens downstream of the amplitude modulator and the phase modulator, and configured to focus the reference light toward the recording medium downstream thereof, thereby generating the interference resulting in reference light and the signal light; and
    a second lens downstream of the recording medium and configured to focus the signal light onto a photodetector downstream thereof in a read configuration.

13. The spatial light modulator according to claim 1, further comprising a first lens downstream of the amplitude modulator and the phase modulator, and configured to focus the downstream light and the signal light onto a recording medium downstream thereof in a write configuration.

* * * * *